Figure 6:
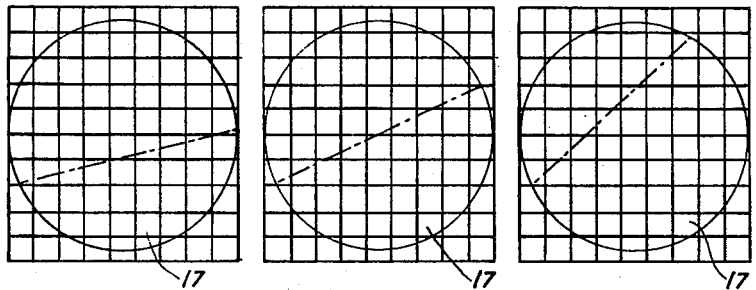
Figure 9:
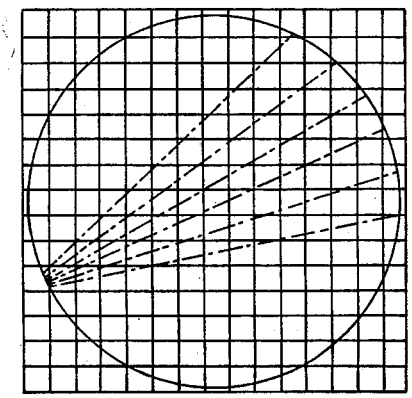

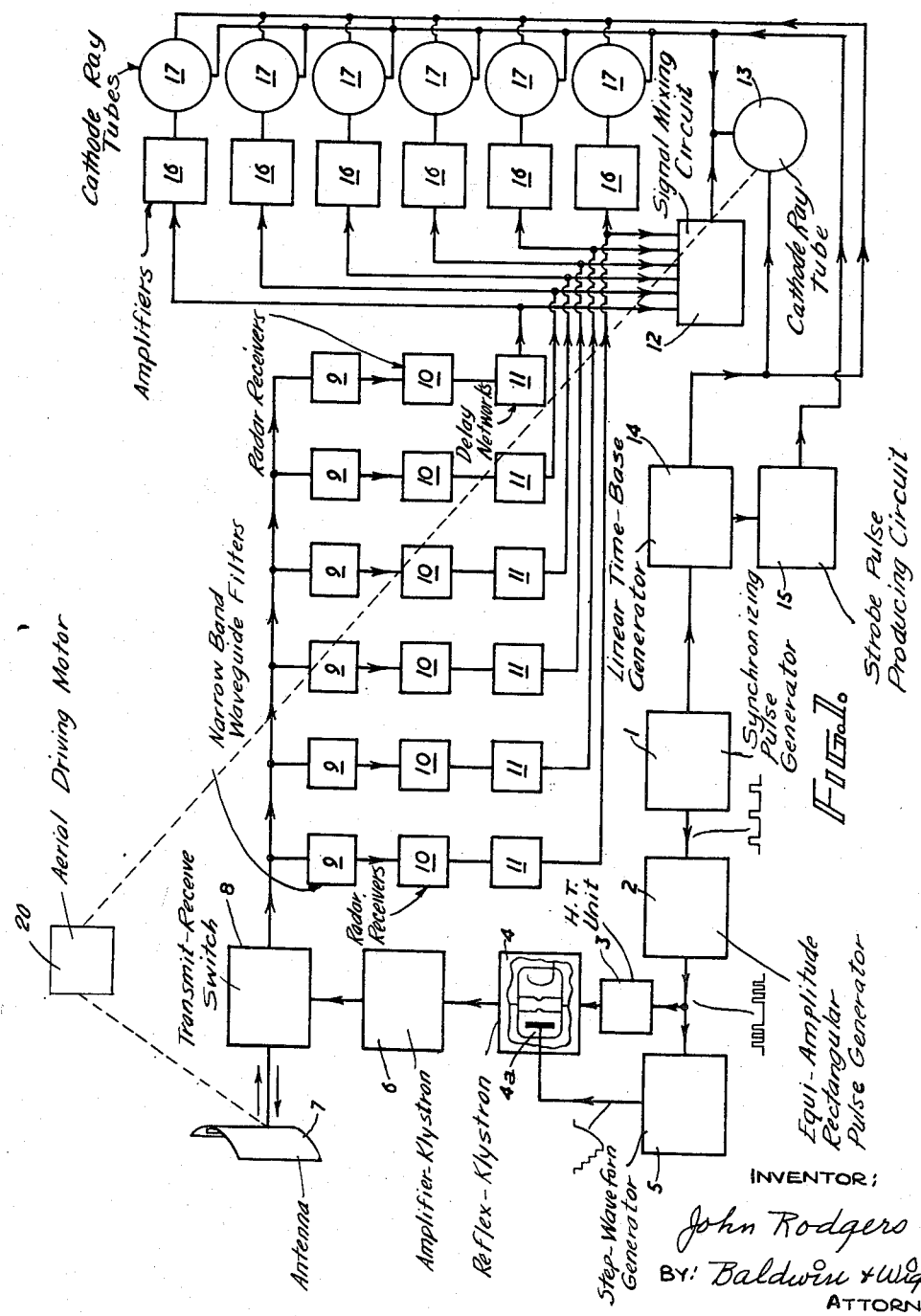

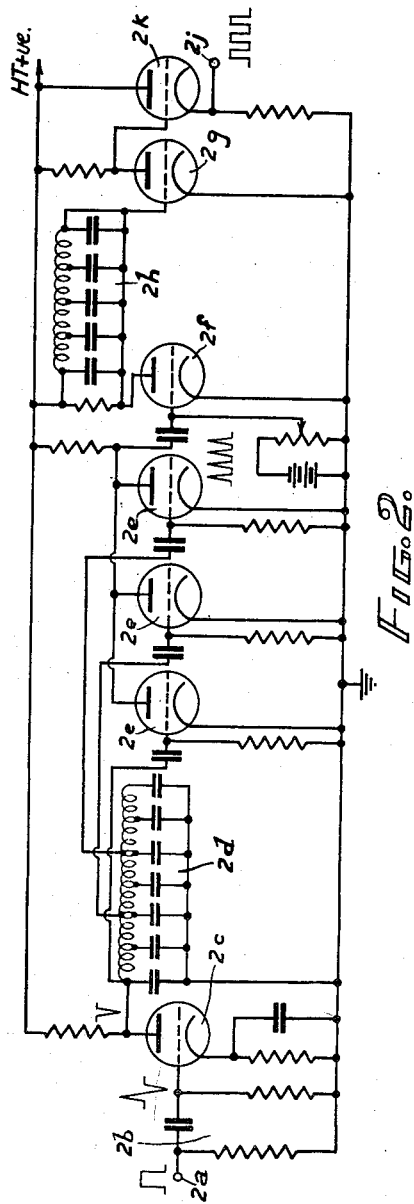

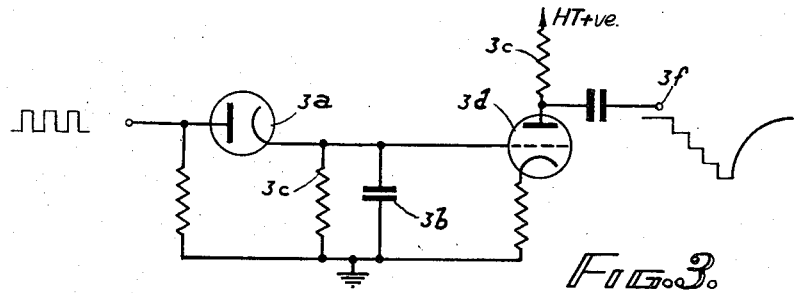
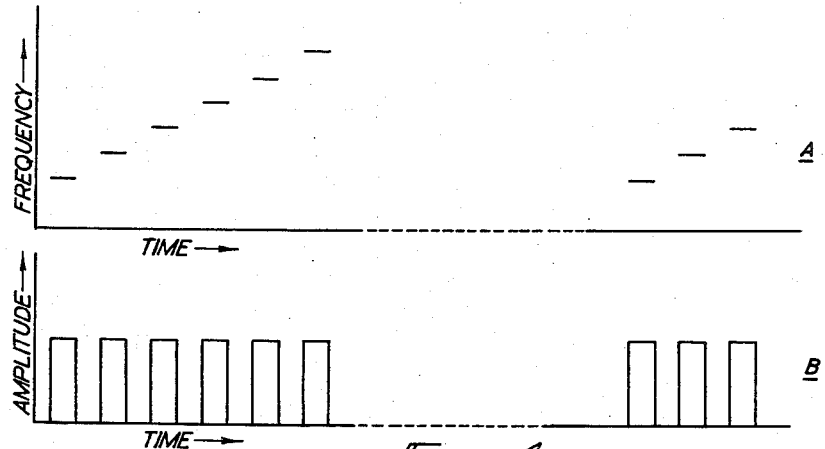
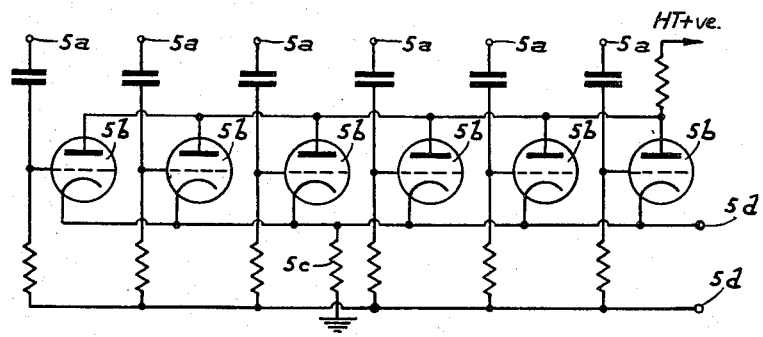

INVENTOR:
John Rodgers
BY: Baldwin & Wight
ATTORNEYS

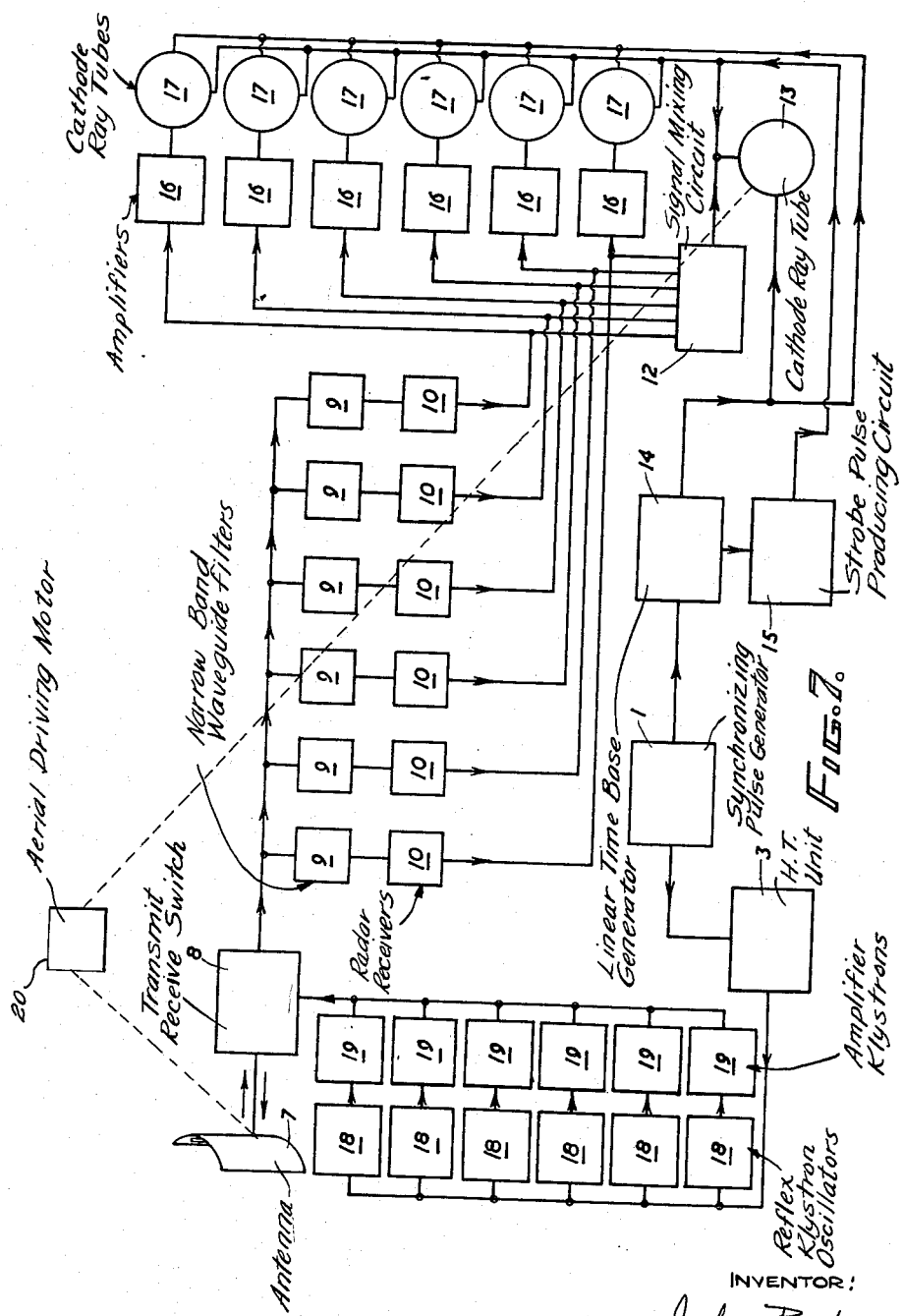

3,029,429
PULSE RADAR SYSTEMS
John Rodgers, Essex, England, assignor to Marconi's Wireless Telegraph Company Limited, London, England, a British company
Filed July 5, 1956, Ser. No. 595,894
Claims priority, application Great Britain July 5, 1955
8 Claims. (Cl. 343—16)

This invention relates to radar systems and more particularly to radar systems of the kind which provide height information of a target by utilizing the well known property of a linear array of slots or other aerials in that it emits a radio energy beam whose angle to the line of the array, is substantially at right angles thereto or departs from the right angle direction in dependence upon the frequency of the energy fed to the aerial.

Various radar systems exist in which height information is obtained by energizing a linear array with radio energy, the frequency of which is continuously varied over a substantial range of frequencies, thus obtaining a fan-shaped coverage diagram which is in the plane of the array. Energy reflected from a distant target is of a frequency determined by the height of the target and thus analysis of the frequency of the reflected energy provides target height information.

One of the major disadvantages of known systems of the kind referred to is that since such systems use receivers of very wide band-width to analyze reflected signals an unsatisfactory signal-to-noise ratio is obtained and the systems are prone to interference from radio-jamming devices. Furthermore, as only a single receiver is used to carry out the frequency analysis, high-power jamming interference at one frequency within the receiver frequency band can render the whole radar system ineffective. It has been proposed to use in such a known system a receiver whose local oscillator is swept in frequency in synchronism with the transmitter whereby in effect narrow band reception is obtained. This does not eliminate the effects of jamming, however, as jamming signals within the band will be received because the complete frequency band is swept.

The object of the present invention is to provide a height finding radar system having narrow frequency band receiving circuits and capable of continuing in operation in the presence of high-power radio-jamming interference.

According to this invention a radar system of the kind comprising a transmitting aerial whose direction of transmission is dependent upon the frequency fed thereto, comprises means for generating and transmitting from said aerial discrete pulses of different frequencies within the range of frequencies said aerial is adapted to handle, means for receiving reflected echo pulses, means for separating reflected echo pulses of different frequencies from one another and means for displaying signals derived from the separated different frequency pulses.

The discrete pulses of different frequencies may be transmitted simultaneously or they may be transmitted in time sequence.

Figure 8:
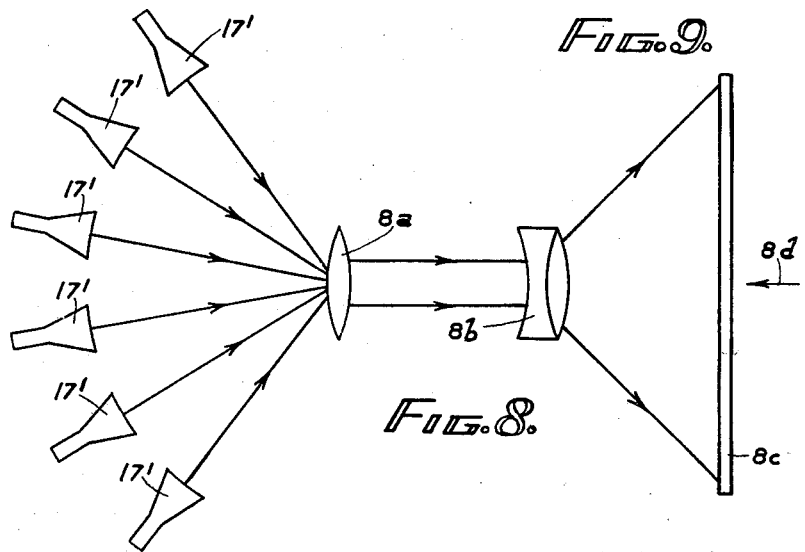

Preferably the received reflected echo pulses of different frequencies are separated from one another by frequency selective circuits one for each frequency. These and various other objects and features of the invention will be more clearly understood from a reading of the detailed description of the invention in conjunction with the drawing in which:

FIGURES 1 and 7 are block diagrams of two illustrative embodiments of this invention;
FIGURES 2 and 3 are schematic representations of portions of the embodiment of FIGURE 1,
FIGURES 4A and 4B are time plots versus frequency and amplitude, respectively, of signals in the embodiment of FIGURE 1,
FIGURE 5 is a schematic representation of portions of the embodiments of FIGURES 1 and 7,
FIGURES 6 and 9 are pictorial views of display screens in which the chain lines indicate time-base traces, and
FIGURE 8 shows diagrammatically how a combined height display is produced.

Referring to FIG. 1, a synchronizing pulse generator 1 produces rectangular pulses at the required pulse repetition frequency (P.R.F.) of the radar system. Said pulses are used to lock the frequency of operation of a further pulse generator 2, which produces a train of equi-amplitude rectangular pulses each time a synchronizing pulse is applied, the number of pulses in each train of pulses being equal to the number of discrete frequencies to be transmitted.

A suitable and well known circuit for pulse generator 2 is shown in FIG. 2, in which synchronizing pulses are applied at 2a to a differentiating network 2b. An amplifier valve 2c passes the positive going differentiated pulses and produces amplified, negative-going pulses in its anode circuit which are passed down a delay line 2d. Delayed pulses are tapped off from different points down the line 2d and separately amplified in valves 2e. The delay line taps are so spaced from each other and a sufficient number provided that a train of pulses appears at the common anode circuit of valves 2e which when shaped and amplified, is suitable for triggering H.T. unit 3, of FIG. 1. Said shaping and amplification is carried out by valves 2f and 2g and a shaping, delay-line 2h and the resultant train of rectangular pulses is available at the output 2j of a cathode-follower 2k. Pulse trains from 2 are applied to control the H.T. supply 3 of a reflex-klystron 4, so that the operation of said klystron is made intermittent. The pulse train output from 2 is also taken to a step-waveform generator 5 well known per se which may be of the form shown by FIG. 3 in which pulse trains are applied, through a diode 3a, to an integrating circuit comprising a capacitor 3b in parallel with a resistor 3c. Said integrating circuit is arranged to have a time constant such that the charge on capacitor 3b increases in steps as each pulse, of a train of pulses, is applied thereto and such that said capacitor discharges through resistor 3c during the time between the end of one train of pulses and the beginning of the next. The voltage across capacitor 3b is applied to the grid of an amplifier valve 3d thereby causing the voltage across the load resistor 3e of said valve to drop in steps from a high value to a low value and then return to the high value again, the stepped voltage being available at 3f.

In FIG. 1, the stepped voltage output from 5 is applied to the reflector electrode 4a of klystron 4 thereby causing the frequency of oscillation of the klystron to jump from one frequency to another in synchronism with the variation of said voltage.

The operation and the frequency of oscillation of klystron 4 are so arranged that its output comprises groups of pulses of radio energy, said groups occurring at a frequency equal to the pulse repetition frequency, the frequency of the radio energy contained in each pulse being different from that of adjacent pulses by substantially equal amounts and each pulse containing a higher frequency than the one preceding it. FIG. 4 shows graphically the relationship between the components of the output from klystron 4, graph A having co-ordinates of frequency and time, and graph B having co-ordinates of pulse-amplitude and time. Said klystron output is amplified in an amplifier klystron 6 and fed to an antenna 7 via a wide-band transmit-receive switch 8, which may conveniently be of the so-called "twist-duplexer" type well known per se. Antenna 7, which is cyclically rotated about its vertical axis by means of the motor 20, to point in any direction, may take any one of a number of well known forms but is represented in this embodiment as a linear array consisting of a vertical slotted-waveguide set at the focus of a cylinder parabolic reflector. Furthermore, said antenna is so designed that its vertical plane radiation pattern is of fan-like shape consisting of a number of narrow, pencil-like beams of energy, one for each frequency transmitted, each beam slightly overlapping its neighbours.

On being reflected back from a distant target, energy is received by antenna 7 and fed by switch 8 to a plurality of channels, the number of filters being equivalent to the number of discrete frequencies transmitted. Each of said channels includes a narrow band waveguide filter 9, the sum of the pass bands of the filters 9 being a small proportion of the frequency band which the aerial is adapted to handle. Each filter 9 is tuned to pass one of the frequencies transmitted, and each filter output is connected to a radar receiver 10, of any well known, kind in which the filtered signals are heterodyned to an intermediate frequency and detected. Said detected signals are time delayed in delay networks 11 so that although pulses in any one group reflected by targets having similar ranges but different heights are received sequentially resulting pulses at the outputs of networks 11 will appear at the same time. In the present embodiment six transmitted frequencies have been assumed (as shown in FIG. 4) and therefore six receiver channels have been shown. In practice, the number of frequencies transmitted will usually be at least ten or twelve.

To obtain azimuth and range information, the outputs from delay networks 11 are combined in a signal mixing circuit 12, which circuit may be of the form shown in FIG. 5, said outputs being fed in at terminals 5a to the control grids of valves 5b. Said valves are connected in parallel as cathode-followers having a common cathode load resistance 5c, an output being available at terminals 5d which is applied as brightening-pulses to the grid electrode of a cathode ray tube 13 (FIG. 1) adapted to provide plan position indication (P.P.I.) in the well known manner. The radial time-base for tube 13 is obtained from a linear time-base generator 14, said generator being triggered from the synchronizing source 1, and is rotated in synchronism with aerial 7. As the method and circuits for rotating said time-base are very well understood by those skilled in the art, this information has been omitted in order not to confuse the drawings. The normal strobe spot for tube 13 is obtained from a strobe pulse producing circuit 15, well known per se, fed from time-base generator 14.

In order to display elevation information, the outputs from delay lines 11 are separately amplified in amplifiers 16 and applied as brightening pulses to the grid electrode of a series of cathode ray tubes 17. A further output from time-base generator 14 is connected to the horizontal deflection systems of tubes 17 and a further output from strobe-pulse producing circuit 15 is connected to the vertical deflection systems of said tubes. Thus, a series of A-scan displays are obtained and a pulse due to a reflecting target, from an amplifier 16 will cause the time-base trace to brighten up at a point corresponding to the range of the target and, if the strobe spot has been positioned on the P.P.I. display 13, the time-base will be deformed vertically at the same instant. Therefore an operator will observe on each tube 17 a series of dots corresponding to various targets at various ranges the locus of which is a straight line and according to the P.P.I. target being strobed so one of the dots on one of the A-scan displays will be extended into a short line indicating that the strobed target has an elevation within the range of elevations covered by the said display.

Although, from a knowledge of range and elevation, the height of a target may be readily computed, the display tubes 17 may be so arranged that height information can be read off directly. To accomplish this result, each tube is rotated so that its time-base trace lies, not horizontally, but at an angle to the horizontal equivalent to the mean angle of elevation of the radiation lobe in which targets displayed on said tube are situated. A graticule, having suitable co-ordinates, is placed over the screen of each tube so that the position of a spot, appearing on the screen, determined by the polar co-ordinates of (slant) range and elevation can be read off in terms of the cartesian co-ordinates of height (ordinates) and, if required, ground range (abscissae). So that displays on the screens shall be readily comparable, a small standing bias voltage is appropriately applied to the deflection systems of the tubes such that the time-base of each tube commences at a similar co-ordinate point on the graticules. Such an arrangement is illustrated in FIG. 6 in which three display screens are shown and the chain lines indicate time-base traces.

In the embodiment of FIG. 1 a single transmitter the frequency of which is varied, is used periodically and sequentially to radiate energy lobes having different cycles of elevation and delay-lines are inserted in the receiver channels to cause the received pulses in any one train of pulse to appear at the same time. A further embodiment of the invention in which separate transmitters are used to radiate at the same time a plurality of energy lobes having different elevations inter se is shown in FIG. 7 in which six transmitted frequencies are again assumed. Referring to FIG. 7, a synchronizing pulse generator 1 controls, directly, a H.T. supply unit 3 so that H.T. is applied intermittently, at the P.R.F. of the radar system, to a plurality of reflex klystron oscillators 18, each one of said oscillators being generally similar to oscillator 4 of FIG. 1 and having a frequency of operation greater than that of its preceding neighbour and less than that of its succeeding neighbor by substantially equal amounts. Oscillators 18 are connected in parallel to H.T. unit 3 so that pulses of energy appear at their outputs at the same instant said output pulses being amplified in amplifier klystrons 19 (generally similar to amplifiers 6 of FIG. 1) and then fed in parallel to a transmit-receive unit 8 and radiated from an antenna 7, in a similar manner to that described with reference to FIG. 1.

The receiver section of the embodiment of FIG. 7 is similar in all respects to that of FIG. 1 except in that as energy pulses of different frequency are radiated at the same instant they will therefore be received at the same instant (for targets having similar ranges) and therefore delay-networks 11 are not necessary.

As stated hereinbefore, the number of frequencies transmitted by a radar system according to the invention will usually be at least ten or twelve and therefore a similar number of height display tubes will be necessary, which, having regard to the fact that several P.P.I. displays will be normally required and each P.P.I. will have its own bank of height displays, would be expensive and unwieldy. One method of overcoming this problem is shown in FIG. 8, in which small projection type cathode ray tubes 17' are substituted for the more conventional tubes 17 of FIGS. 1 and 7, and arranged so that their emergent light rays pass through the focal point of a diverging lens 8a. The resulting combined rays are then projected by a projecting lens unit 8b onto a screen 8c which is viewed from the direction of arrow 8d. Projection tubes 17' are differently rotated inter se, as explained with reference to FIG. 6 and thus a combined height display is obtained on screen 8c of the form shown by FIG. 9.

As will be readily appreciated the methods of obtaining height information shown in the foregoing embodiments are not the only methods available and the output signals from amplifiers 16 of FIGS. 1 and 7 may for example be fed to any one of a number of well known electronic and electro-mechanical computer devices.

I claim:

1. A system wherein discrete pulses of different frequencies are transmitted in time sequence and comprising an aerial of the kind having a direction of transmission in the vertical plane dependent on the frequency fed thereto, means for cyclically varying the direction of transmission of said aerial in the horizontal plane, a pulse generator of a predetermined pulse repetition frequency greater than the frequency of variation of the horizontal directivity of said aerial, means for producing a train of predetermined number of pulses from each pulse of said generator, means for translating each successive pulse of each train into a pulse of a different radio frequency, corresponding pulses in successive trains being of the same radio frequency, means for applying the radio frequency pulses to said aerial for transmission therefrom, means for receiving echoed radio frequency pulses and feeding the same to a plurality of narrow band radio frequency filters fed from said receiving means and each selective to a different one of the transmitted radio frequencies, detectors adapted to detect the signals passed by the filters, means for differently delaying signals from the detectors by amounts such that the differently delayed detected signals corresponding to the pulses of a train occur substantially simultaneously, and means for displaying the differently delayed detected signals to give both azimuthal and elevational information.

2. A system wherein discrete pulses of different frequencies are transmitted in time sequence and comprising an aerial of the kind having a direction of transmission in the vertical plane dependent on the frequency fed thereto, means for cyclically varying the direction of transmission of said aerial in the horizontal plane, a pulse generator of a predetermined pulse repetition frequency greater than the frequency of variation of the horizontal directivity of said aerial, means for producing a train of a predetermined number of pulses from each pulse of said generator, means for translating each successive pulse of each train into a pulse of a different radio frequency, corresponding pulses in successive trains being of the same radio frequency, means for applying the radio frequency pulses to said aerial for transmission therefrom, means for receiving echoed radio frequency pulses and feeding the same to a plurality of narrow band radio frequency filters fed from said receiving means and each selective to a different one of the transmitted radio frequencies, detectors adapted to detect the signals passed by the filters, means for differently delaying signals from the detectors by amounts such that the differently delayed detected signals corresponding to the pulses of a train occur substantially simultaneously, and means for displaying the differently delayed detected signals to give both azimuthal and elevational information, the aforesaid translating means comprising a radio frequency oscillator whose frequency is dependent upon the magnitude of a voltage applied thereto, means for applying the pulses of the trains to said oscillator to actuate the same to produce a radio frequency pulse in response to each applied pulse, means for producing a voltage step wave from each train of pulses, and means for applying said step wave to the oscillator to vary the radio frequency of the produced radio frequency pulses from pulse to pulse in each train.

3. A system wherein discrete pulses of different frequencies are transmitted simultaneously and comprising an aerial of the kind having a direction of transmission in the vertical plane dependent on the frequency fed thereto, means for cyclically varying the direction of transmission of said aerial in the horizontal plane, a pulse generator of a predetermined pulse repetition frequency, means for producing a plurality of simultaneously occurring pulses of different radio frequencies in response to each pulse from said generator, means for applying said simultaneously occurring pulses to said aerial for transmission therefrom, means for receiving echoed radio frequency pulses and feeding the same to a plurality of narrow band radio frequency filters fed from said receiving means and each selective to a different one of the transmitted radio frequencies, detectors adapted to detect the signals passed by the filters, and means for displaying the detected signals to give both azimuthal and elevational information.

4. A system wherein discrete pulses of different frequencies are transmitted in time sequence and comprising an aerial of the kind having a direction of transmission in the vertical plane dependent on the frequency fed thereto, means for cyclically varying the direction of transmission of said aerial in the horizontal plane, a pulse generator of a predetermined pulse repetition frequency, greater than the frequency of variation of the horizontal directivity of said aerial, means for producing a train of predetermined number of pulses from each pulse of said generator, means for translating each successive pulse of each train into a pulse of a different radio frequency, corresponding pulses in successive trains being of the same radio frequency, means for applying the radio frequency pulses to said aerial for transmission therefrom, means for receiving echoed radio frequency pulses and feeding the same to a plurality of narrow band radio frequency filters fed from said receiving means and each selective to a different one of the transmitted radio frequencies, detectors adapted to detect the signals passed by the filters, means for differently delaying signals from the detectors by amounts such that the differently delayed detected signals corresponding to the pulses of a train occur substantially simultaneously, and means for displaying the differently delayed detected signals, said detected signals being applied as brightening signals to different ones of a plurality of display cathode ray tubes to each of which a time base deflection of the pulse repetition frequency is applied and a coordinate deflection derived from a range strobe pulse producing circuit is also applied.

5. A system wherein discrete pulses of different frequencies are transmitted simultaneously and comprising an aerial of the kind having a direction of transmission in the vertical plane dependent on the frequency fed thereto, means for cyclically varying the direction of transmission of said aerial in the horizontal plane, a pulse generator of a predetermined pulse repetition frequency, means for producing a plurality of simultaneously occurring pulses of different radio frequencies in response to each pulse from said generator, means for applying said simultaneously occurring pulses to said aerial for transmission therefrom, means for receiving echoed radio frequency pulses and feeding the same to a plurality of narrow band radio frequency filters fed from said receiving means and each selective to a different one of the transmitted radio frequencies, detectors adapted to detect the signals passed by the filters, and means for displaying the detected signals, said detected signals being applied as brightening signals to different ones of a plurality of display cathode ray tubes, time base deflection means connected to said cathode ray tubes for applying pulses of the pulse repetition frequency and range strobe pulse producing means coupled to said cathode ray tubes for applying coordinate deflection pulses thereto.

6. A radar system comprising a transmitting aerial whose directivity in the vertical plane is dependent upon the frequency, within a range of frequencies which said aerial is adapted to handle, fed thereto, means for cyclically varying the directivity of said aerial in the horizontal plane, pulse generating means connected to said aerial for transmitting during each cycle of variation of the horizontal directivity thereof, a plurality of groups of pulses, each group comprising discrete pulses of different frequencies within the range of frequencies, a plurality of narrow band frequency selective channels, one for each of said different frequencies, for separating from one another reflected echo pulses of different frequencies and lying within said range of frequencies, means in said channels for providing simultaneously occurring output signals in response to received echo pulses, from a given target range, of each of said groups and means for employing output signals from said channels to provide both azimuthal and elevational information.

7. A system as claimed in claim 6, wherein said pulse generating means includes means for simultaneously generating discrete pulses of different frequencies.

8. A system as claimed in claim 6, wherein said pulse generating means includes means for sequentially generating discrete pulses of different frequencies.

References Cited in the file of this patent

UNITED STATES PATENTS

| | | |
|---|---|---|
| 2,403,728 | Loughren | July 9, 1946 |
| 2,433,804 | Wolff | Dec. 30, 1947 |
| 2,490,808 | Hoffman | Dec. 13, 1949 |
| 2,522,367 | Quanella | Sept. 12, 1950 |
| 2,525,328 | Wolff | Oct. 10, 1950 |
| 2,724,825 | Davenport | Nov. 22, 1955 |
| 2,822,536 | Sandretto | Feb. 4, 1958 |
| 2,901,747 | Sunstein | Aug. 25, 1959 |

FOREIGN PATENTS

| | | |
|---|---|---|
| 529,886 | Canada | Sept. 4, 1956 |